United States Patent
Uchihashi et al.

(10) Patent No.: US 10,331,739 B2
(45) Date of Patent: *Jun. 25, 2019

(54) VIDEO SEARCH APPARATUS, VIDEO SEARCH METHOD, AND NON-TRANSITORY COMPUTER READABLE MEDIUM

(71) Applicant: FUJI XEROX CO., LTD., Tokyo (JP)

(72) Inventors: Shingo Uchihashi, Kanagawa (JP); Motofumi Fukui, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 298 days.

This patent is subject to a terminal disclaimer.

(21) Appl. No.: 15/225,183

(22) Filed: Aug. 1, 2016

(65) Prior Publication Data

US 2017/0255699 A1 Sep. 7, 2017

(30) Foreign Application Priority Data

Mar. 7, 2016 (JP) ................................. 2016-043050

(51) Int. Cl.
*G06F 16/00* (2019.01)
*G06F 16/735* (2019.01)
(Continued)

(52) U.S. Cl.
CPC ...... *G06F 16/735* (2019.01); *G06F 16/24578* (2019.01); *G06F 16/71* (2019.01)

(58) Field of Classification Search
CPC ........... G06F 17/30828; G06F 17/3053; G06F 17/30858; G06F 16/735; G06F 16/71; G06F 16/24578
(Continued)

(56) References Cited

U.S. PATENT DOCUMENTS

2002/0157095 A1* 10/2002 Masumitsu ............ H04N 5/445
725/46
2003/0115067 A1* 6/2003 Ibaraki ............... H04N 5/44513
704/275
(Continued)

FOREIGN PATENT DOCUMENTS

| JP | 2001-160955 A | 6/2001 |
| JP | 2002-099574 A | 4/2002 |
| JP | 2010-288024 A | 12/2010 |

OTHER PUBLICATIONS

Boreczky et al; "Comparison of video shot boundary detection techniques;" Journal of Electronic Imaging; vol. 5, No. 2; Apr. 1996; pp. 122-128.

*Primary Examiner* — Thanh-Ha Dang
(74) *Attorney, Agent, or Firm* — Oliff PLC

(57) ABSTRACT

A video search apparatus includes a storing unit, an input unit, and a search unit. The storing unit stores video data along with video attributes information indicating, for each concept, a confidence score that the concept is included in the video data. The input unit inputs, as preference information, a coefficient of each concept which is desired to be included in video to be searched for and a coefficient of a superordinate concept of the concept which is desired to be included in the video to be searched for. The search unit searches for, based on the preference information input by the input unit, video that matches the preference information from among the video data stored in the storing unit.

6 Claims, 14 Drawing Sheets

(51) Int. Cl.
*G06F 16/71* (2019.01)
*G06F 16/2457* (2019.01)

(58) Field of Classification Search
USPC .......................................... 707/748
See application file for complete search history.

(56) References Cited

U.S. PATENT DOCUMENTS

| | | | |
|---|---|---|---|
| 2009/0292685 A1* | 11/2009 | Liu | G06F 16/73 |
| 2011/0142171 A1 | 6/2011 | Yoshida et al. | |
| 2011/0243529 A1* | 10/2011 | Oryoji | G06K 9/00744 |
| | | | 386/248 |
| 2015/0293996 A1* | 10/2015 | Liu | G06F 16/73 |
| | | | 707/723 |
| 2016/0070962 A1* | 3/2016 | Shetty | G06F 16/7834 |
| | | | 382/225 |

* cited by examiner

FIG. 5

| SEGMENT NUMBER | START TIME | END TIME | CONCEPT 1 (SUSHI) | CONCEPT 2 (SOBA) | CONCEPT 3 (SCUBA DIVING) | CONCEPT 4 (GOLF) | CONCEPT 5 (HORSE RIDING) | ... | CONCEPT N (CASTLES) |
|---|---|---|---|---|---|---|---|---|---|
| 1 | 0 | 3436 | 0.196 | 0.179 | 0.412 | 0.195 | 0.134 | ... | 0.312 |
| 2 | 3436 | 4854 | 0.161 | 0.171 | 0.114 | 0.171 | 0.139 | ... | 0.395 |
| 3 | 4854 | 9409 | 0.144 | 0.159 | 0.089 | 0.159 | 0.180 | ... | 0.333 |
| 4 | 9409 | 10994 | 0.167 | 0.195 | 0.167 | 0.195 | 0.249 | ... | 0.105 |
| 5 | 10994 | 12495 | 0.169 | 0.148 | 0.169 | 0.148 | 0.123 | ... | 0.098 |
| 6 | 12495 | 15765 | 0.723 | 0.145 | 0.111 | 0.145 | 0.166 | ... | 0.045 |
| 7 | 15765 | 19234 | 0.512 | 0.195 | 0.112 | 0.179 | 0.166 | ... | 0.095 |
| 8 | 19234 | 25066 | 0.098 | 0.180 | 0.096 | 0.110 | 0.110 | ... | 0.110 |
| ENTIRE VIDEO | MAXIMUM VALUE OF SEGMENTS | | 0.723 | 0.195 | 0.412 | 0.195 | 0.249 | ... | 0.395 |

| SUPERORDINATE CONCEPT 1 (DINING) | SUPERORDINATE CONCEPT 2 (ACTIVITIES) | SUPERORDINATE CONCEPT 3 (SHOPPING) | ... | SUPERORDINATE CONCEPT M (SIGHTSEEING SPOTS) |
|---|---|---|---|---|
| $W_1$ | $W_2$ | $W_3$ | ... | $W_M$ |
| 0.3 | 0.9 | 0.1 | ... | 0.2 |

FIG. 10B

| CONCEPT 1 (SUSHI) | CONCEPT 2 (SOBA) | CONCEPT 3 (SCUBA DIVING) | CONCEPT 4 (GOLF) | CONCEPT 5 (HORSE RIDING) | CONCEPT 6 (SHOPPING) | ... | CONCEPT N (CASTLES) |
|---|---|---|---|---|---|---|---|
| $w_{11}$ | $w_{12}$ | $w_{23}$ | $w_{24}$ | $w_{25}$ | $w_{36}$ | ... | $w_{MN}$ |
| 0.5 | 0.6 | 0.0 | 0.8 | 0.1 | 0.1 | ... | 0.2 |

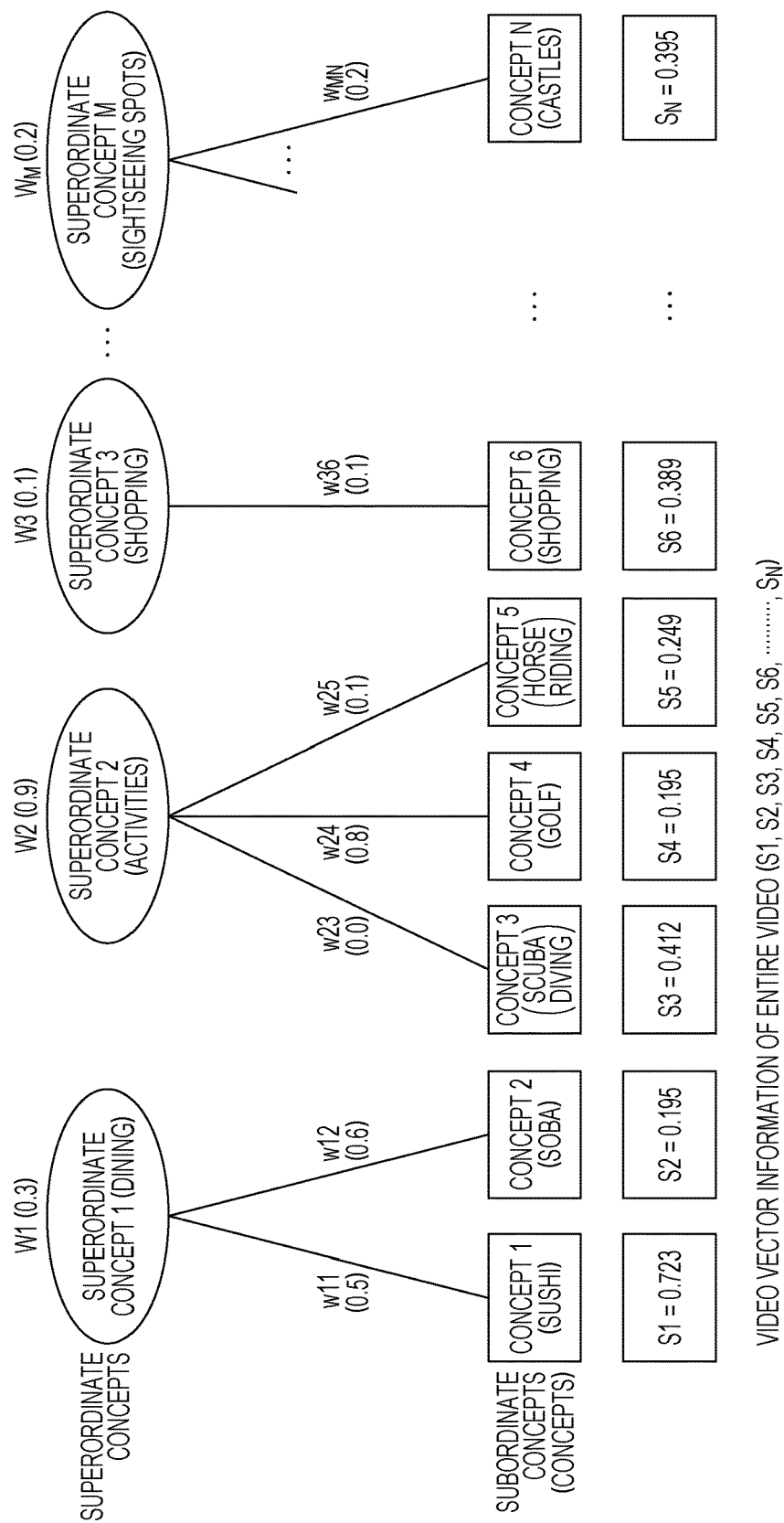

FIG. 12

SCORE FOR SUBORDINATE CONCEPT = S1 · w11 + S2 · w12 + S3 · w23 + S4 · w24 + S5 · w25
+ S6 · w36 + ······ + $S_N$ · $w_{MN}$ ········ (1)

SCORE FOR SUPERORDINATE CONCEPT = W1 · max (S1 · w11, S2 · w12) + W2 · max (S3 · w23, S4 · w24, S5 · w25) ········ (2)
+ w3 · S6 · w36 + ······ + $W_M$ · max ($S_{(N-1)}$ · $W_{M(N-1)}$, $S_N$ · $w_{MN}$)

HERE, max(A, B, C) IS MAXIMUM VALUE AMONG A, B, AND C.

VIDEO SCORE = p × SCORE FOR SUBORDINATE CONCEPT
+ (1 − p) × SCORE FOR SUPERORDINATE CONCEPT ········ (3)

HERE, 0 ≤ p ≤ 1.

FIG. 13

SCORE FOR SUBORDINATE CONCEPT = 0.723 × 0.5 + 0.195 × 0.6 + 0.412 × 0.0 + 0.195 × 0.8
+ 0.249 × 0.1 + 0.389 × 0.1 + ⋯⋯ + 0.395 × 0.2
= 39.621 ⋯⋯⋯⋯ (1)

SCORE FOR SUPERORDINATE CONCEPT = 0.3 × 0.723 × 0.5 + 0.9 × 0.195 × 0.8 + 0.1 × 0.389 × 0.1 +
⋯⋯ + 0.2 × 0.395 × 0.2
= 45.332 ⋯⋯⋯⋯ (2)

VIDEO SCORE = p × SCORE FOR SUBORDINATE CONCEPT + (1 − p)
× SCORE FOR SUPERORDINATE CONCEPT
= 0.4 × 39.621 + 0.6 × 45.332
≈ 43.048 ⋯⋯⋯⋯ (3)

HERE, p = 0.4.

FIG. 14

| ORDER | VIDEO NAME | VIDEO SCORE |
|---|---|---|
| 1 | HAKONE TOURIST INFORMATION | 39.812 |
| 2 | IZU SHUZENJI TOURIST INFORMATION | 31.328 |
| 3 | CHIBA PREFECTURE TOURIST INTRODUCTION VIDEO | 28.606 |
| 4 | NIKKO TOURIST ASSOCIATION PR VIDEO | 19.519 |
| 5 | OKINAWA PREFECTURE TOURIST INTRODUCTION VIDEO | 17.332 |
| 6 | SHINSHU SOBA TRAVEL | 16.214 |
| ⋮ | ⋮ | ⋮ |

VIDEO SEARCH APPARATUS, VIDEO SEARCH METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-043050 filed Mar. 7, 2016.

BACKGROUND

The present invention relates to a video search apparatus, a video search method, and a non-transitory computer readable medium.

SUMMARY

According to an aspect of the invention, there is provided a video search apparatus including a storing unit, an input unit, and a search unit. The storing unit stores video data along with video attributes information indicating, for each concept, a confidence score that the concept is included in the video data. The input unit inputs, as preference information, a coefficient of each concept which is desired to be included in video to be searched for and a coefficient of a superordinate concept of the concept which is desired to be included in the video to be searched for. The search unit searches for, based on the preference information input by the input unit, video that matches the preference information from among the video data stored in the storing unit.

BRIEF DESCRIPTION OF THE DRAWINGS

Exemplary embodiments of the present invention will be described in detail based on the following figures, wherein:

FIG. 5 is a diagram illustrating a specific example of N-dimensional video vector information calculated by the video vector information calculation unit;

FIG. 7 is a diagram illustrating an example of an input screen displayed when preference information of a user is input;

FIGS. 10A and 10B are diagrams illustrating an example of preference information obtained through the screen examples illustrated in FIGS. 7 to 9;

FIG. 11 is a diagram for explaining a method for calculating a score for a subordinate concept and a score for a superordinate concept;

FIG. 12 is a diagram illustrating specific calculation expressions for calculating a score for a subordinate concept, a score for a superordinate concept, and a video score;

FIG. 13 is a diagram illustrating a calculation example in which a score for a subordinate score, a score for a superordinate concept, and a video score are specifically calculated using specific values; and FIG. 14 is a diagram illustrating an example of a search result by a video search unit.

DETAILED DESCRIPTION

Exemplary embodiments of the present invention will be described in detail with reference to drawings.

Figure 1:
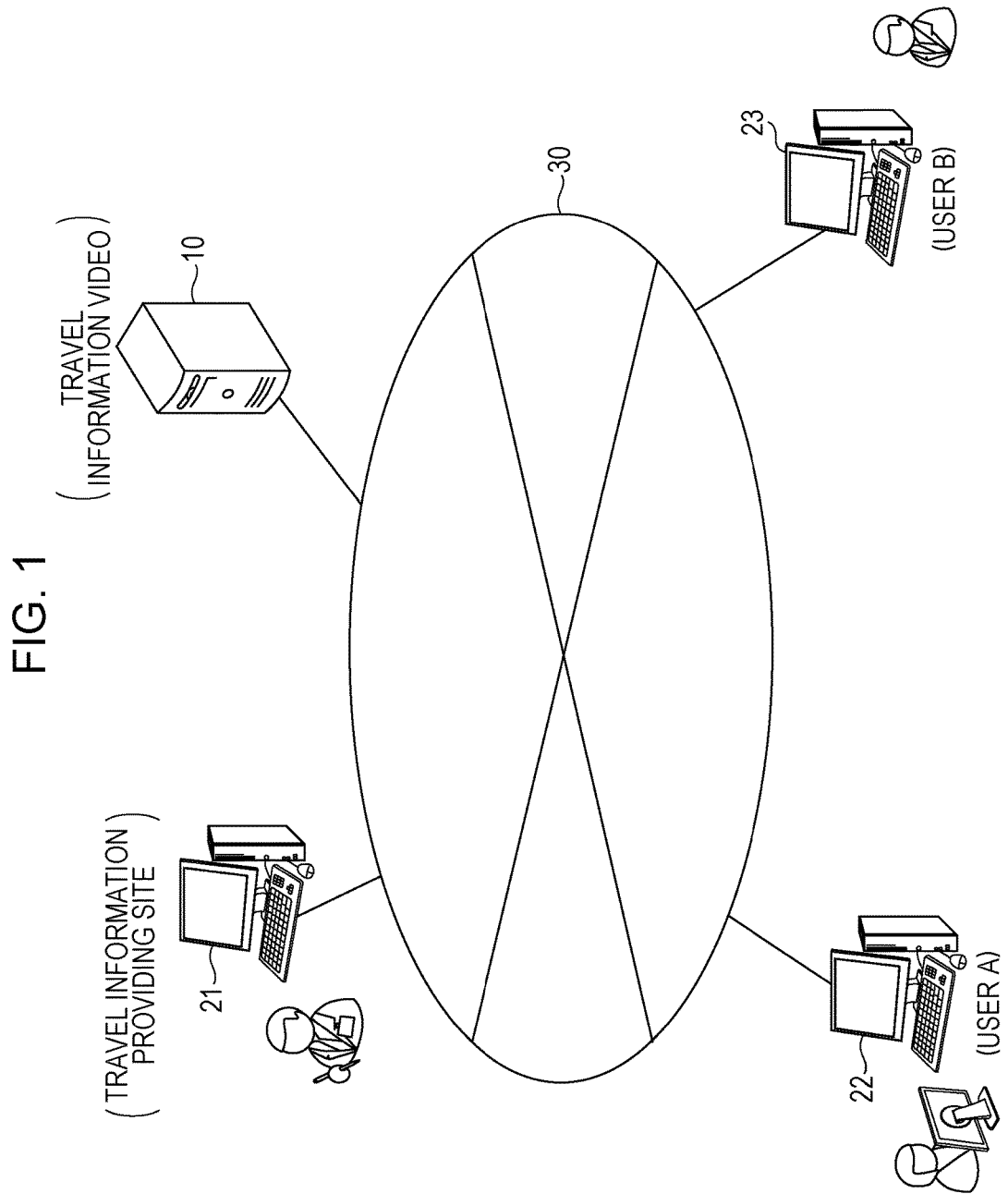
FIG. 1 is a diagram illustrating a system configuration of a travel information providing system according to an exemplary embodiment of the present invention.

FIG. 1 is a system diagram illustrating a configuration of a travel information providing system according to an exemplary embodiment of the present invention.

A travel information providing system according to an exemplary embodiment of the present invention includes, as illustrated in FIG. 1, a server apparatus 10 and terminal apparatuses 21 to 23 which are connected by a network 30 such as the Internet. The server apparatus 10 provides travel information video, and is operated by, for example, a tourist association or the like of each location.

The terminal apparatuses 22 and 23 are personal computers of general users A and B, respectively, and are configured to allow the users to access the server apparatus 10 via the network 30 and browse travel video.

Furthermore, the terminal apparatus 21 is installed at a travel information providing site operated by, for example, a travel information provider or the like. The terminal apparatus 21 is a video search apparatus which selects video matching preference information of the users A and B from among travel information video provided by the server apparatus 10 and provides the selected video to the users A and B.

In FIG. 1, for a simpler explanation, only one server apparatus 10 which provides travel information video is illustrated. In actuality, however, a large number of server apparatuses exist. Furthermore, in FIG. 1, only two users A and B are illustrated. In actuality, however, a large number of users use the travel information providing system.

Figure 2:
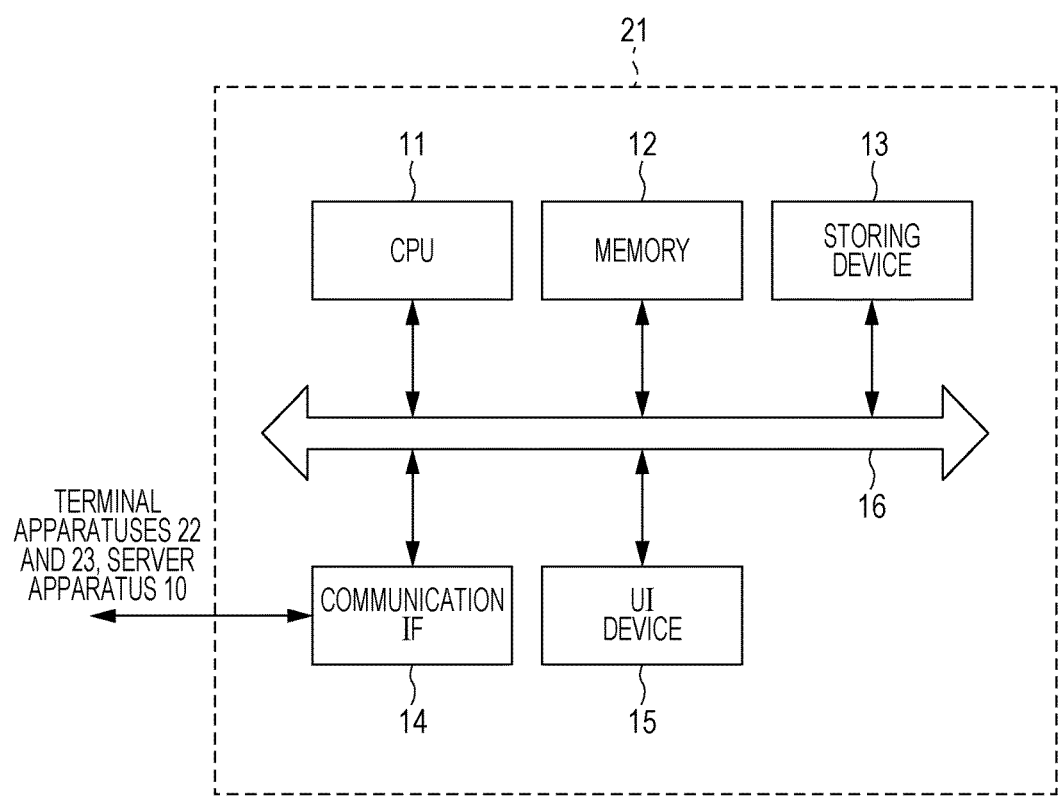
FIG. 2 is a block diagram illustrating a hardware configuration of a terminal apparatus according to an exemplary embodiment of the present invention.

A hardware configuration of the terminal apparatus 21 which functions as a video search apparatus in a travel information providing system according to an exemplary embodiment is illustrated in FIG. 2.

The terminal apparatus 21 includes, as illustrated in FIG. 2, a central processing unit (CPU) 11, a memory 12, a storing device 13 such as a hard disk drive (HDD), a communication interface (IF) 14 which performs transmission and reception of data to and from an external apparatus or the like via the network 30, and a user interface (UI) device 15 which includes a touch panel or a liquid display and a keyboard. The above components are connected to one another via a control bus 16.

The CPU 11 performs a predetermined process based on a control program stored in the memory 12 or the storing device 13, and controls an operation of the terminal apparatus 21. In this exemplary embodiment, an explanation is provided in which the CPU 11 reads a control program stored in the memory 12 or the storing device 13 and executes the read control program. However, the program may be stored in a storing medium such as a compact disc-read only memory (CD-ROM) and provided to the CPU 11.

Figure 3:
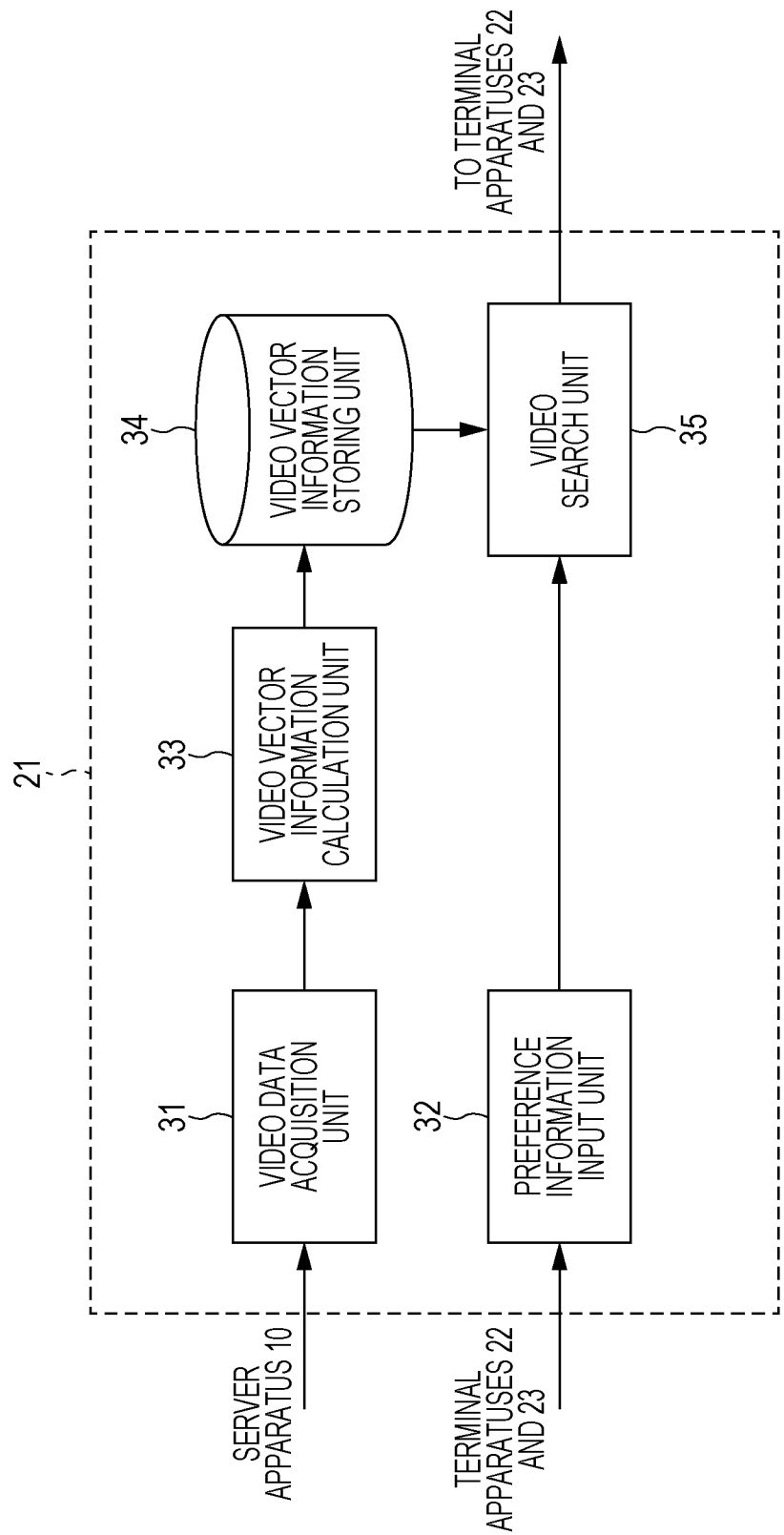
FIG. 3 is a block diagram illustrating a functional configuration of a terminal apparatus according to an exemplary embodiment of the present invention.

FIG. 3 is a block diagram illustrating a functional configuration of the terminal apparatus 21 which is implemented by executing the above control program.

The terminal apparatus 21 according to this exemplary embodiment includes, as illustrated in FIG. 3, a video data acquisition unit 31, a preference information input unit 32, a video vector information calculation unit 33, a video vector information storing unit 34, and a video search unit 35.

The video data acquisition unit 31 acquires, via the network 30, for example, video data such as travel information video provided by the server apparatus 10.

The preference information input unit 32 inputs, as preference information, a coefficient of each concept which is desired to be included in travel information video to be searched for and a coefficient of a superordinate concept of each concept which is desired to be included in video to be searched for.

In this exemplary embodiment, video to be searched for is travel information video. Therefore, for example, various items including golf, tennis, horse riding, strawberry picking, ramen, soba, sushi, castles, shrines, temples, and world heritage sites are set as concepts.

Furthermore, as a superordinate concept of each concept, for example, an item "activities" is set as a superordinate concept of concepts such as golf, tennis, horse riding, and strawberry piking, an item "dining" is set as a superordinate concept of concepts such as ramen, soba, and sushi, and an item "sightseeing spots" is set as a superordinate concept of concepts such as castles, shrines, temples, and world heritage sites.

Details of preference information will be described later.

The video vector information calculation unit 33 calculates, based on video data acquired by the video data acquisition unit 31, video vector information (video attributes information) indicating, for each concept representing the contents of video data, the confidence score that (the degree to which) the concept is included in the video data.

Specifically, the video vector information calculation unit 33 calculates video vector information by dividing video data into plural segments according to the contents of the video data, calculating the confidence score that each concept is included in each of the divided segments, selecting the maximum value of the confidence scores in the plural segments for each concept, and defining the selected value as the confidence score of the concept.

The video vector information storing unit 34 stores video data acquired by the video data acquisition unit 31 as well as video vector information calculated by the video vector information calculation unit 33.

The video search unit 35 searches for, based on preference information input by the preference information input unit 32, video data that matches the preference information from among video data stored in the video vector information storing unit 34.

Specifically, the video search unit 35 calculates, based on a coefficient of each concept in preference information and a confidence score of the concept in video vector information, a score for a subordinate concept (matching degree of a subordinate concept), calculates, based on a coefficient of a superordinate concept in the preference information, a coefficient of each concept included in the superordinate concept, and a confidence score of the concept included in the superordinate concept in the video vector information, a score for the superordinate concept (matching degree of the superordinate concept), calculates, based on the score for the subordinate concept and the score for the superordinate concept, a video score (matching degree) of the video data and the preference information, and searches for video data that matches the input preference information.

Next, an operation of the terminal apparatus 21 in the travel information providing system according to this exemplary embodiment will be described in detail with reference to drawings.

Figure 4:
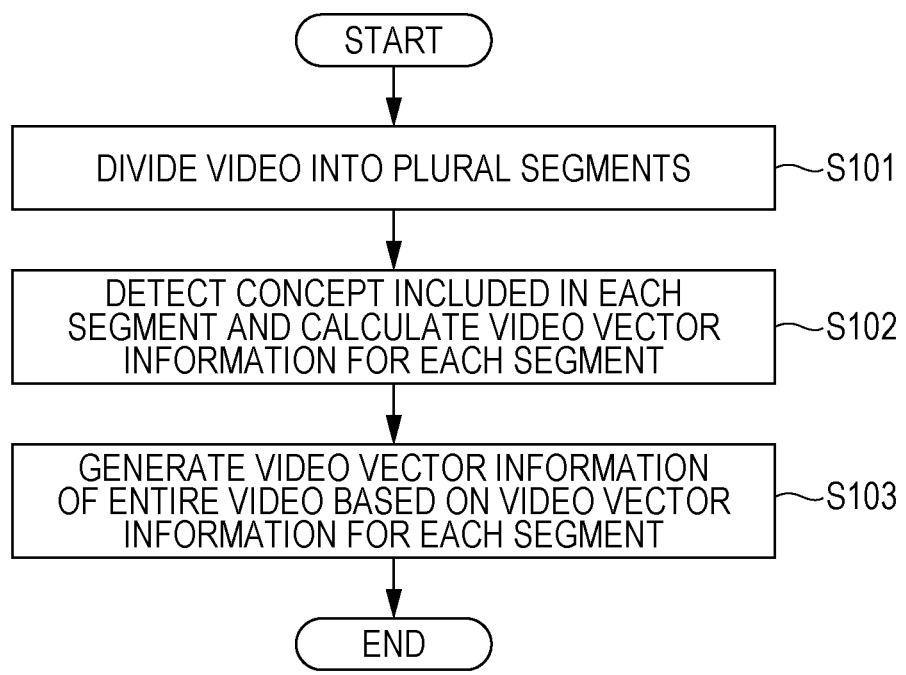
FIG. 4 is a flowchart for explaining a process for calculating video vector information by a video vector information calculation unit.

First, a process for calculating video vector information by the video vector information calculation unit 33 will be described with reference to a flowchart of FIG. 4.

The video vector information calculation unit 33 analyzes the contents of video acquired by the video data acquisition unit 31 to divide the video into plural segments according to the set of contents (step S101).

Next, the video vector information calculation unit 33 detects each concept included in each of the divided segments of the video, using a method such as object detection, image recognition, scene recognition, and motion analysis, and calculates video vector information for each segment (step S102).

For concept detection, each segment is further divided into sub-segments, and concept detection processing is performed for each of the sub-segments. Then, the maximum value of detection values of all the sub-segments is defined as the final detection value of the segment. In this case, sub-segments may overlap.

Furthermore, in such concept detection, structure analysis is performed for each frame in a segment, and a detection result obtained at the moment at which the best composition is obtained is defined as the final detection value of the segment.

Such concept detection may be performed by analyzing a foreground and a background, performing object detection for the foreground, and performing scene recognition for the background.

Then, the video vector information calculation unit 33 calculates video vector information of the entire video by selecting the maximum value of confidence scores of each concept in video vector information for individual segments and defining the selected value as the confidence score of the concept. In the case where there are N concepts for which confidence score is to be detected, N-dimensional video vector information is calculated.

A specific example of N-dimensional video vector information calculated as described above is illustrated in FIG. 5.

In FIG. 5, a case where a piece of image data is divided into eight segments 1 to 8 and confidence scores (0 to 1) of N concepts are calculated for the segments 1 to 8 is illustrated. The number of segments into which video data is divided is not limited to eight.

N concepts: concept 1 (sushi), concept 2 (soba), concept 3 (scuba diving), concept 4 (golf), concept 5 (horse riding), . . . , and concept N (castles), are set as concepts whose confidence score is to be detected.

Confidence scores of N concepts are values each representing the degree of likelihood that the concept is included in video. The confidence score that the concept is included in the video increases as the value increases.

By selecting the maximum value of video vector information of eight segments for individual concepts and collecting the selected maximum values, video vector information of the entire video (0.723, 0.195, 0.412, . . . , 0.395), which is N-dimensional vector information, is generated.

That is, the video vector information of the entire video is information indicating the confidence score that each concept is included in any of the segments.

Referring to FIG. 5, for example, the confidence score of the concept 1 (sushi) exhibits a large value "0.723" in the segment 6, which represents that video of the segment 6 is highly likely to be video having something to do with sushi, such as video in which a person is eating sushi or video in which a person is introducing sushi.

Next, an example of the relationship between superordinate concepts and subordinate concepts (concepts) in the travel information providing system according to this exemplary embodiment will be described with reference to FIG. 6.

Figure 6:
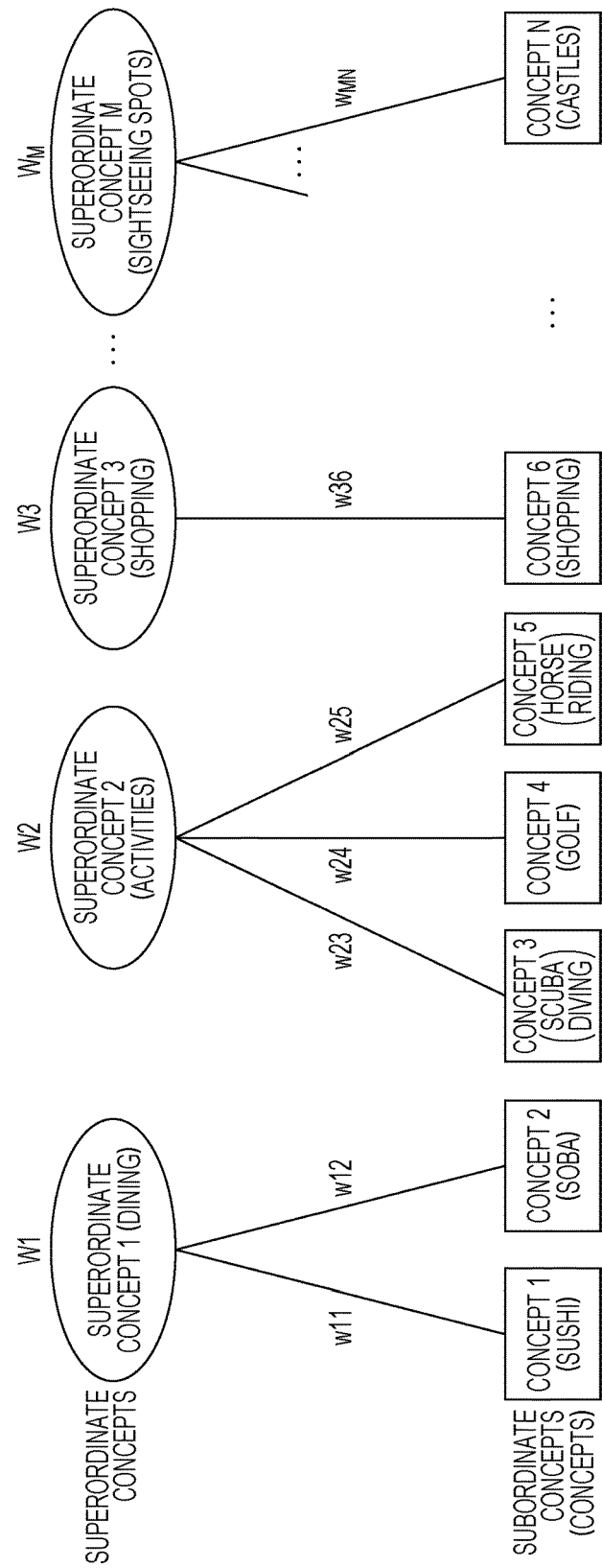
FIG. 6 is a diagram for explaining an example of the relationship between superordinate concepts and subordinate concepts (concepts) in a travel information providing system according to an exemplary embodiment of the present invention.

In the example illustrated in FIG. 6, an item of superordinate concept 1 (dining) is set as a superordinate concept of the concept 1 (sushi) and the concept 2 (soba), which are subordinate concepts. Furthermore, an item of superordinate concept 2 (activities) is set as a superordinate concept of the concept 3 (scuba diving), the concept 4 (golf), and the concept 5 (horse riding), which are subordinate concepts.

Plural concepts may not be set as subordinate concepts for a single superordinate concept. As with the case of superordinate concept 3 (shopping) and the concept 6 (shopping), only one concept may be set for a single superordinate concept. Furthermore, a concept may be included in each of plural superordinate concepts. Setting may be performed such that, for example, a concept "castles" is included in a superordinate concept "sightseeing spots" and a superordinate concept "history".

In this example, w11, w12, w23, w24, w25, w36, . . . , and $w_{MN}$ are coefficients representing the degree of preference of a user for the concepts 1 to N. Furthermore, W1, W2, W3, . . . , and $W_M$ represent coefficients representing the degree of preference of a user for the superordinate concepts 1 to M.

That is, by setting a large value for a coefficient corresponding to a concept which is desired to be included in video to be searched for among the coefficients w1, w12, w23, w24, w25, w36, . . . , an $w_{MN}$ of the concepts, video including the concept is preferentially ranked high in a search result. Furthermore, by setting a large value for a coefficient corresponding to a superordinate concept which is desired to be included in video to be searched for among the coefficients W1, W2, W3, . . . , and $W_M$ of the superordinate concepts, video including a concept belonging to the superordinate concept is preferentially ranked high in a search result.

Next, examples of an input screen displayed when the preference information input unit 32 inputs preference information of the users A and B through the terminal apparatuses 22 and 23 or the like will be described with reference to FIGS. 7 to 9.

For example, a case where in a questionnaire for user registration of the users A and B with a travel information providing site, preference of the users A and B for traveling is investigated and preference information is generated, will be described.

Figure 7:
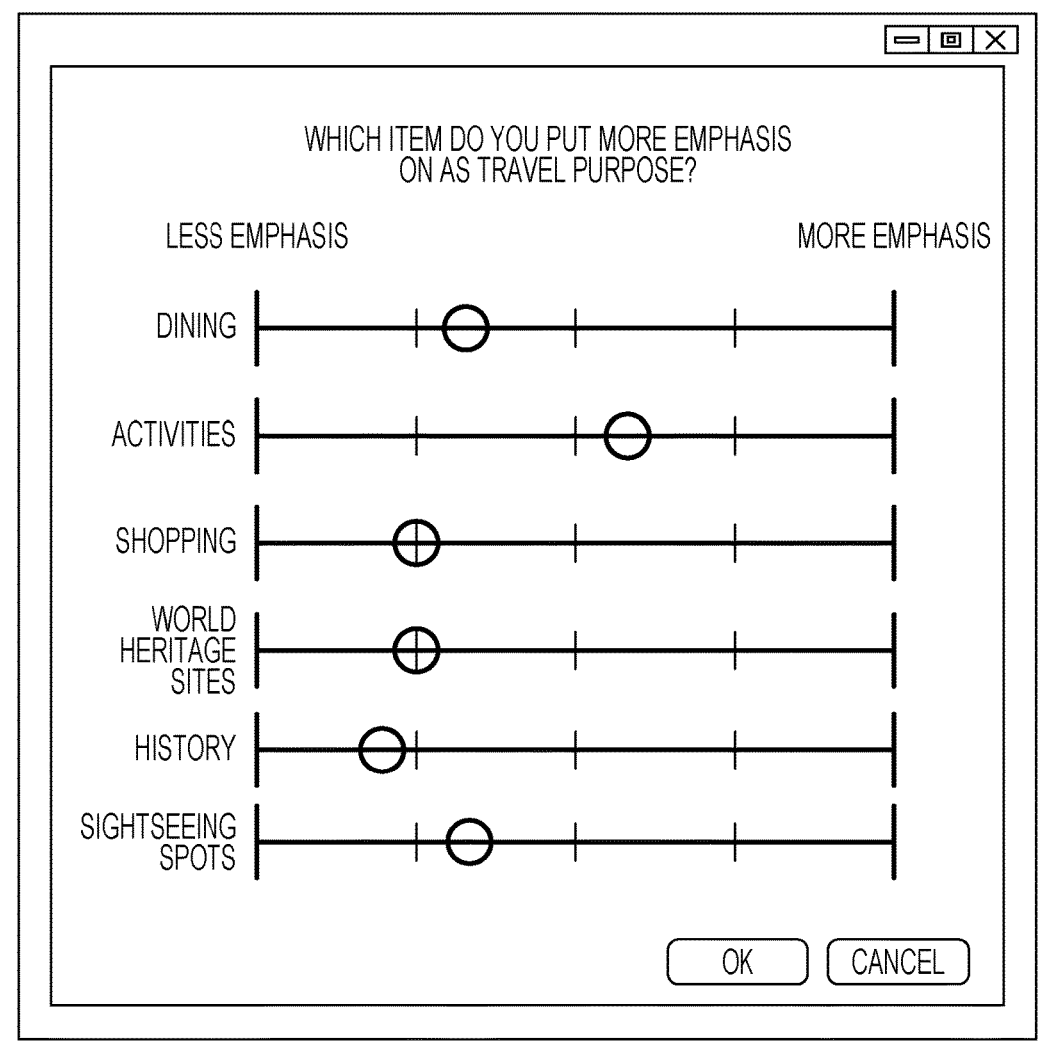

First, the preference information input unit 32 displays a screen illustrated in FIG. 7, which provides a question as to on which item the user puts emphasis as a travel purpose, and prompts the user to input the degree to which the user puts emphasis on individual items. In the screen example illustrated in FIG. 7, the item "activities" is set as a travel purpose on which more emphasis is put than the other items.

Figure 8:
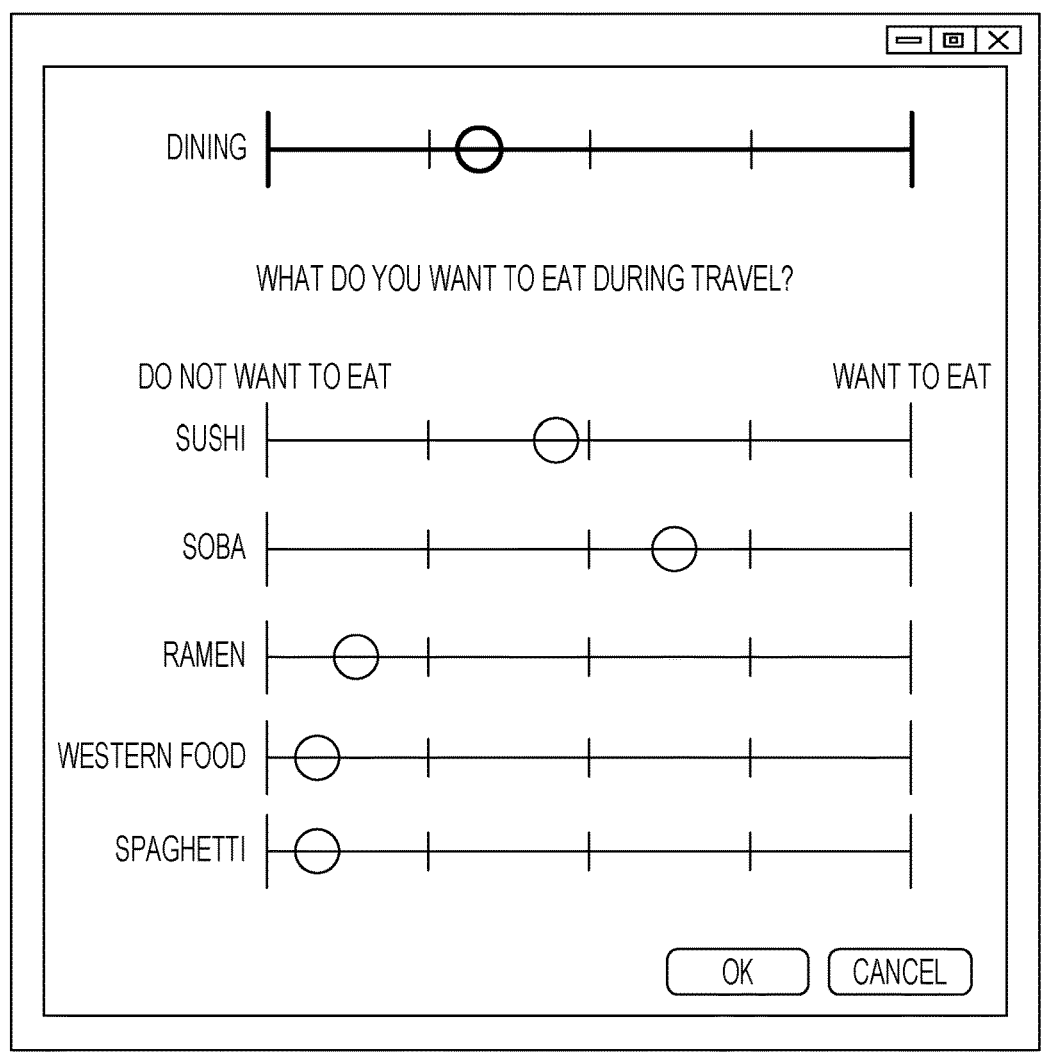
FIG. 8 is a diagram illustrating an example of an input screen displayed when preference information of a user is input.

Next, the preference information input unit 32 displays the screen illustrated in FIG. 8, which prompts the user to input the degree to which the user wants to eat individual concepts, which are subordinate concepts included in the superordinate concept "dining", during travel.

Figure 9:
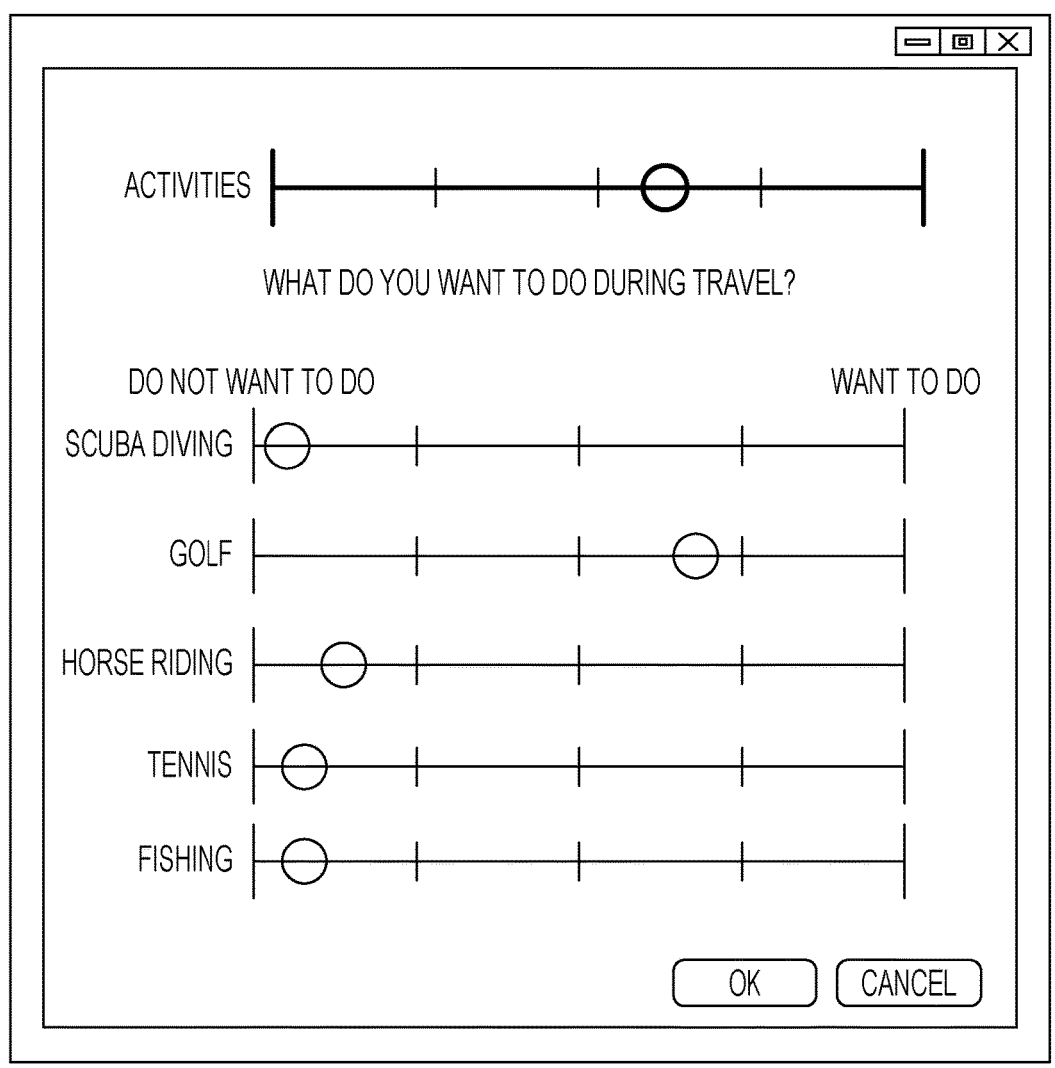
FIG. 9 is a diagram illustrating an example of an input screen displayed when preference information of a user is input.

Furthermore, in a similar manner, the preference information input unit 32 displays the screen illustrated in FIG. 9, which prompts the user to input the degree to which the user wants to do individual concepts, which are subordinate concepts included in the superordinate concept "activities", during travel. In the screen example illustrated in FIG. 9, the item "golf" is set as a travel purpose on which more emphasis is put than the other items.

Then, questionnaires for the other items of superordinate concepts are sequentially presented to the user, and preference information of the user is obtained.

The preference information input unit 32 displays the screens illustrated in FIGS. 7 to 9 to obtain preference information of travelling from the user, and sets the coefficients W1, W2, . . . , and $W_N$ of superordinate concepts and the coefficients w11, w12, w23, . . . , and $w_{MN}$ of concepts, which are subordinate concepts, as preference information.

An example of preference information obtained as described above through the screen examples of FIGS. 7 to 9 is illustrated in FIGS. 10A and 10B.

In FIGS. 10A and 10B, as a coefficient of a superordinate concept, the coefficient W1 of the superordinate concept 1 (dining) is set to "0.3" and the coefficient W2 of the superordinate concept 2 (activities) is set to "0.9". That is, the user puts more emphasis on activities than dining as a travel purpose, and setting is performed such that information including activities is preferentially provided as travel information video to be provided to the user.

Furthermore, in FIGS. 10A and 10B, as a coefficient of a subordinate concept (concept), the coefficient W11 of the concept 1 (sushi) is set to "0.5", the coefficient W12 of the concept 2 (soba) is set to "0.6", the coefficient W23 of the concept 3 (scuba diving) is set to "0.0", and the coefficient W24 of the concept 4 (golf) is set to "0.8". That is, the user desires to obtain travel information of sushi and soba. However, the user desires to obtain travel information of golf more than travel information of dining. Therefore, the above values are set.

The preference information input unit 32 may automatically obtain preference information based on the contents written to a social networking service (SNS) of the user, instead of inputting preference information based on the contents input by the user as described above, and input a coefficient of a superordinate concept and a coefficient of each concept.

Next, processing for calculating a score for a subordinate concept, a score for a superordinate concept, and a video score by the video search unit 35 in the case where the preference information illustrated in FIGS. 10A and 10B is set, will be described with reference to FIGS. 11 to 13.

First, a method for calculating a score for a subordinate concept and a score for a superordinate concept will be described with reference to FIG. 11.

As illustrated in FIG. 11, the video search unit 35 calculates a score for a subordinate concept, based on the N-dimensional video vector information (S1, S2, S3, . . . , and $S_N$) of the entire video illustrated in FIG. 5 and the coefficients w11, w12, w23, . . . , and $w_{MN}$ of the concepts, which are subordinate concepts, illustrated in FIGS. 10A and 10B.

Furthermore, the video search unit 35 calculates a score for a superordinate concept, based on the N-dimensional video vector information (S1, S2, S3, . . . , and $S_N$), the coefficients w11, w12, w23, . . . , and $w_{MN}$ of the concepts illustrated in FIGS. 10A and 10B, and the coefficients W1, W2, . . . , and $W_N$ of superordinate concepts.

Then, the video search unit 35 calculates, based on the score for the subordinate concept and the score for the superordinate concept, a video score representing the matching degree of video data and preference information.

Specific calculation expressions for calculating a score for a subordinate concept, a score for a superordinate concept, and a video score is illustrated in FIG. 12.

First, the score for the subordinate concept is obtained by multiplying the video vector information ($S1, S2, S3, \ldots,$ and $S_N$) by the coefficients $w11, w12, w23, \ldots,$ and $w_{MN}$ of individual concepts and obtaining an accumulated value of the results, as represented by expression (1) of FIG. 12.

Specifically, the score for the subordinate concept is obtained by calculating $S1 \cdot w11 + S2 \cdot w12 + S3 \cdot w23 + \ldots + S_N \cdot w_{MN}$.

Then, the score for the superordinate concept is obtained by multiplying, for each category of a superordinate concept, the maximum value of values obtained by multiplying the value of a confidence score of each concept of video vector information by a coefficient of the concept by a coefficient of the category of the superordinate concept and then accumulating the values obtained for individual superordinate concepts, as represented by expression (2) of FIG. 12.

For example, for the superordinate concept 1 (dining), the maximum value of $S1 \cdot w11$ and $S2 \cdot w12$ is obtained based on $\max(S1 \cdot w11, S2 \cdot w12)$. For example, in the case where $S1 \cdot w11$ is maximum, $W1 \cdot S1 \cdot w11$, which is obtained by multiplying the value by the coefficient $W1$ of the superordinate concept 1, is defined as a value for the superordinate concept 1. Then, such a value is obtained for each superordinate concept, and a value obtained by accumulating the values is defined as a score for a superordinate concept.

Furthermore, the video score is calculated by multiplying the score for the subordinate concept and the score for the superordinate concept by $p$ and $(1-p)$, respectively, and adding the obtained results, as represented by expression (3) of FIG. 12. The value of $p$ is equal to or more than 0 and smaller than or equal to 1. That is, the value of $p$ represents a value for setting which one of the score of the superordinate concept and the score of the subordinate concept is to be given priority. More priority is given to the score for the subordinate concept as the value of $p$ increases, and more priority is given to the score for the superordinate concept as the value of $p$ decreases.

A calculation example in which a score for a subordinate concept, a score for a superordinate concept, and a video score are specifically calculated by substituting the values of an example of video vector information illustrated in FIG. 5 and the values of coefficients illustrated in FIGS. 10A and 10B in the expressions illustrated in FIG. 12, is illustrated in FIG. 13. In FIG. 13, a case where the value of $p$ for calculating a video score is set to 0.4 is illustrated.

As represented by expression (1) of FIG. 13, a value $0.723 \times 0.5 + 0.195 \times 0.6 + \ldots + 0.395 \times 0.2 = 39.621$ is calculated as a score for a subordinate concept.

Furthermore, as represented by expression (2) of FIG. 13, a value $0.3 \times 0.723 \times 0.5 + 0.9 \times 0.195 \times 0.8 + \ldots + 0.2 \times 0.395 \times 0.2 = 45.332$ is calculated as a score for a superordinate concept.

Then, as represented by expression (3) of FIG. 13, a value $0.4 \times 39.621 + 0.6 \times 45.332 \approx 43.048$ is calculated as a video score.

Then, the video search unit 35 calculates the above video score for each travel information video obtained by the video data acquisition unit 31, and provides a list obtained by rearranging the calculated video scores in descending order as a search result to a user.

An example of such a search result obtained by the video search unit 35 is illustrated in FIG. 14.

In FIG. 14, an example in which travel information video obtained from various travel information providing sites are arranged in the descending order of video scores is illustrated. In such a search result, travel information video matching preference information of a user is placed in a high rank in the search result. Therefore, by selecting travel information video in a high rank in the search result, the user is able to view travel information video matching preference of the user.

The terminal apparatus 21 according to this exemplary embodiment may set, for a superordinate concept and a concept as a subordinate concept, preference of a user as a coefficient. That is, as illustrated in FIGS. 10A and 10B, the coefficients $w11, w12, \ldots,$ and so on may be set for individual concepts of subordinate concepts, and the coefficients $W1, W2, \ldots,$ and so on may be set for individual superordinate concepts.

Accordingly, the terminal apparatus 21 according to this exemplary embodiment may obtain travel information video which matches more closely to preference of a user in a higher rank in a search result.

With a system in which a coefficient is set only for a concept of a subordinate concept, even if a large value is set for a coefficient of a concept that a user wants to view most, when the number of other concepts for which a certain size of coefficient is set is large, travel information video including the concept that the user wants to view most may not be found by search.

For example, even in the case illustrated in FIGS. 10A and 10B in which the coefficients $w11$ and $w12$ of the concept (sushi) and the concept 2 (soba) are set to 0.5 and 0.6, respectively, each of which is less than 0.8, which is the coefficient $w24$ of the concept 4 (golf), travel information video including both sushi and soba may be placed in a high rank in the search result. That is, only travel information video of "sushi" and "soba" may be placed in a high rank in the search result.

However, as illustrated in FIGS. 10A and 10B, setting is performed also for a coefficient of a superordinate concept. Therefore, setting is performed such that travel information video that a user desires to view more is not associated with dining but is associated with activities. Accordingly, travel information video including golf as a concept is searched for more preferentially than travel information video including a concept such as sushi or soba.

Furthermore, for calculation of a score for a superordinate concept, only the maximum value of values each obtained by multiplying a confidence score of each concept and a coefficient of the concept is selected, and a coefficient for a superordinate concept is multiplied by the selected maximum value. Therefore, regardless of the number of concept items included in each superordinate concept, various travel information video including concepts belonging to different superordinate concepts may be searched for.

In the foregoing exemplary embodiment, a case where video data matching preference information is searched for from among video data of travel information has been described. However, the present invention is not limited to this. The present invention may also be applied to a case where video data different from travel information video is searched for.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A video search apparatus comprising:
a memory that stores video data along with video attributes information indicating, for each concept, a confidence score that the concept is included in the video data; and
a processor that is programmed to:
receive preference information from a terminal apparatus, the preference information being a coefficient of each concept which is desired to be included in video to be searched for and a coefficient of a superordinate concept, the superordinate concept being a concept representing a category to which a plurality of each of the concepts which is desired to be included in the video to be searched for belong;
search for, based on the input preference information, video that matches the preference information from among the stored video data; and
output results of the search to the terminal apparatus.

2. The video search apparatus according to claim 1, wherein the processor is programmed to:
calculate the video attributes information by:
dividing video data into a plurality of segments according to contents of the video data;
calculating a confidence score that each concept is included in each of the divided segments;
selecting, for each concept, a maximum value of the confidence scores in the plurality of segments; and
defining the selected maximum value as the confidence score of the concept.

3. The video search apparatus according to claim 2, wherein the processor is programmed to:
search for video data that matches the input preference information by:
calculating, based on a coefficient of each concept of the preference information and a confidence score of the concept in the video attributes information, a matching degree of a subordinate concept;
calculating, based on a coefficient of a superordinate concept of the preference information, a coefficient of each concept included in the superordinate concept, and a confidence score of the concept included in the superordinate concept in the video attributes information, a matching degree of the superordinate concept; and
calculating, based on the matching degree of the subordinate concept and the matching degree of the superordinate concept, a matching degree of the video data and the preference information.

4. The video search apparatus according to claim 1, wherein the processor is programmed to:
search for video data that matches the input preference information by:
calculating, based on a coefficient of each concept of the preference information and a confidence score of the concept in the video attributes information, a matching degree of a subordinate concept;
calculating, based on a coefficient of a superordinate concept of the preference information, a coefficient of each concept included in the superordinate concept, and a confidence score of the concept included in the superordinate concept in the video attributes information, a matching degree of the superordinate concept; and
calculating, based on the matching degree of the subordinate concept and the matching degree of the superordinate concept, a matching degree of the video data and the preference information.

5. A video search method comprising:
storing video data along with video attributes information indicating, for each concept, a confidence score that the concept is included in the video data;
receiving, as preference information from a terminal apparatus, the preference information being a coefficient of each concept which is desired to be included in video to be searched for and a coefficient of a superordinate concept, the superordinate concept being a concept representing a category to which a plurality of each of the concepts which is desired to be included in the video to be searched for belong;
searching for, based on the input preference information, video that matches the preference information from among the stored video data; and
outputting results of the search to the terminal apparatus.

6. A non-transitory computer readable medium storing a program causing a computer to execute a process for video search, the process comprising:
storing video data along with video attributes information indicating, for each concept, a confidence score that the concept is included in the video data;
receiving, as preference information from a terminal apparatus, the preference information being a coefficient of each concept which is desired to be included in video to be searched for and a coefficient of a superordinate concept, the superordinate concept being a concept representing a category to which a plurality of each of the concepts which is desired to be included in the video to be searched for belong;
searching for, based on the input preference information, video that matches the preference information from among the stored video data; and
outputting results of the search to the terminal apparatus.

* * * * *